Aug. 25, 1942.  A. Y. DODGE  2,293,717

CONSTANT VELOCITY UNIVERSAL JOINT

Filed Sept. 16, 1938

INVENTOR
Adiel Y. Dodge
BY Parker, Carlson, Pitzner & Hubbard
ATTORNEYS

Patented Aug. 25, 1942

2,293,717

UNITED STATES PATENT OFFICE 2,293,717

CONSTANT VELOCITY UNIVERSAL JOINT

Adiel Y. Dodge, Rockford, Ill.

Application September 16, 1938, Serial No. 230,238

3 Claims. (Cl. 64—21)

This invention relates to universal joints of the type adapted for transmitting a constant velocity from one shaft to another.

The object of my invention is to provide a constant velocity universal joint which combines in a novel manner certain features of construction serving to produce new and improved results. Among the objects of my invention is the provision of a universal joint relatively small in size but so designed as to have capacity to negotiate large angular changes in the axes of the driving and driven shafts and to transmit heavy torque loads with comparatively low frictional resistance to any and all of its movements. Another object of my invention is to provide a universal joint which is self-supporting, that is, one which does not require more than one bearing close to the driving or driven ends for supporting the parts in operative relation. Another object of my invention is to so design and coordinate the parts as to permit of manufacture at a comparatively low cost.

Other objects and attendant advantages will be appreciated by those skilled in this art as the invention becomes better understood by reference to the following description and claims and from the accompanying drawing, in which—

Figure 1:
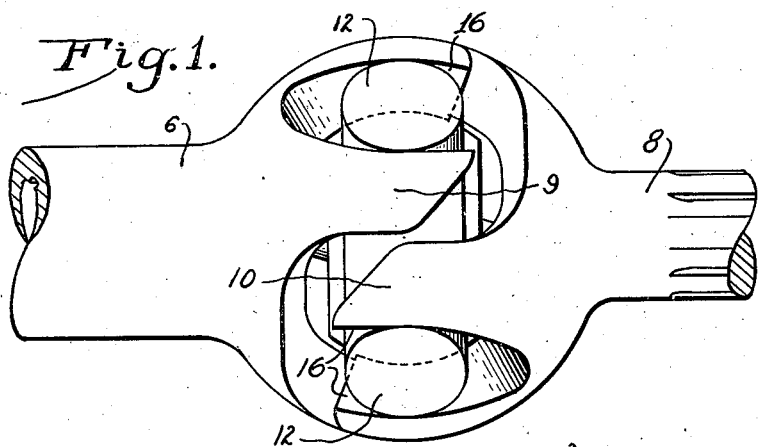
Figure 1 is a perspective view of a universal joint embodying the present invention and having its casing removed.

The universal joint shown by way of illustration includes a sleeve 6 splined to a shaft 7 and a shaft 8 which is splined for connection with a power transmitting element. As is well understood in this art, either of the shafts 7 or 8 may be the driving member. In the present embodiment, the sleeve 6 is integral with a forked member 9 and the shaft 8 is integral with a similar forked member 10. The outer and inner surfaces respectively of the forked members 9 and 10 are spherical with a common center, the outer surfaces providing a seating surface for a complemental spherical casing 14 which will be later described.

Within the yoke members is a spider 11 which has four trunnions 15 spaced 90 degrees apart. Each trunnion is encased in a thimble-like bearing member 12 having suitable bearing on its respective trunnion as by means of roller or needle bearings 13 and suitable means well known in this art may be provided for lubrication of these bearings. Each member 12 is disposed between opposed parallel bearing faces 16 formed on one of the forked members and serves to transmit the driving torque directly between said members. The members 12 also act as wheels during angular movement of the driving and driven members so as to reduce friction between the contacting surfaces. The parts may be held in concentric relation by the outer casing 14 which serves the additional purpose of retaining the bearing thimbles 12 in place. The casing 14 may be made in two or more pieces and attached together by means of a suitable bayonet lock in which one of the pieces has a series of circumferentially spaced outstanding lugs adapted to enter the slots or grooves in the opposite piece.

My invention provides means operative between the forked members and the spider member for causing the latter to be maintained in a position to bisect the angle between the driving and driven members at all angular positions of the latter while at the same time maintaining the center of the spider member coincident with the intersection of the axes of the driving and driven shafts 7 and 8. This is accomplished by a beam structure in which a cylindrical beam member 24 has a spherical end 24' seated in a socket fixed on the axis of the forked member 9 and an opposite spherical end 24" seated in a cylindrical bearing element 20 slidably mounted in a bore 17 in the opposite forked member 10.

Figure 2:
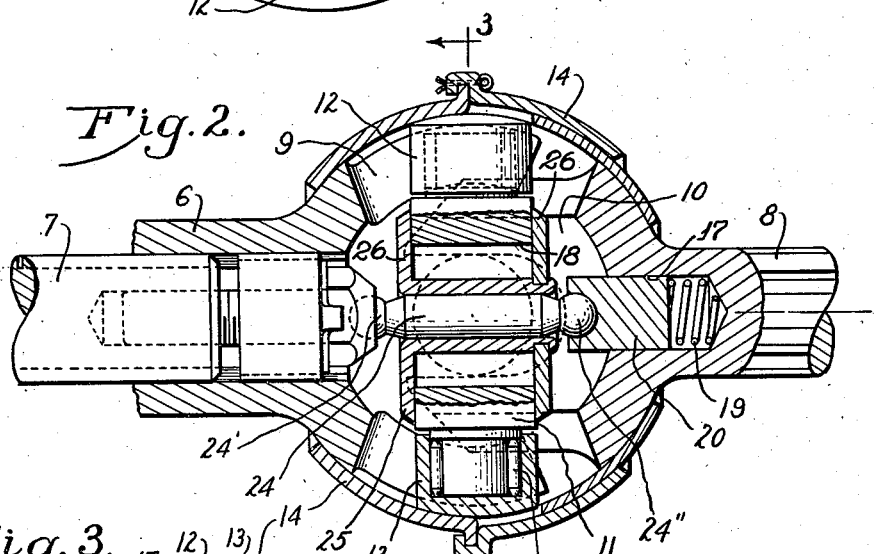
Fig. 2 is a fragmentary longitudinal section.
Figure 3:
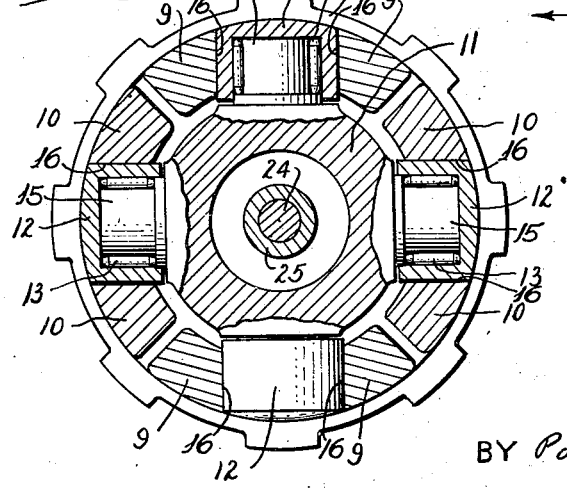
Fig. 3 is a transverse section taken substantially on the section line 3—3 of Fig. 2.

The center line of the beam 24 will have an angle relative to the driving and the driven shafts equal to one-half of the angle between said shafts at all times, but said center line of the beam 24 does not coincide with the desired center line of the spider 11 except at a 180-degree shaft angle although it is always parallel with the desired center line of said spider. In order to accommodate this radial displacement of the beam member 24 and maintain the spider member in the desired relation to the driving and driven shafts and at the same time maintain the center of the spider member coincident with the intersection of the axis of the shaft member, I employ a crosshead 25 that is suitably H-shaped in longitudinal section as clearly appears in Fig. 2. This member 25 has a central bore which slidably receives the cylindrical beam member 24 and the central portion of the member 25 is disposed within a larger central bore 18 in the spider member to allow for radial displacement of said member under movement of the beam 25. The flanges 26 of the crosshead member 25 have flat bearing contact against the sides of the spider member 11. Thus, the beam 24, through its cooperation with the crosshead member 25, maintains the spider member in the desired relation with respect to the driving and driven members to transmit the torque load at constant velocity at all times regardless of the angular relation of the shafts.

I claim:

1. A universal joint comprising a forked driving member, a forked driven member, a spider member, wheel members for transmitting torque from the driving member to the spider member and thence to the driven member, the wheel members being equi-distant from the center of the spider member, and means operating between the driving and driven members and cooperating with the spider member to cause the spider member and the torque transmitting wheel members to bisect the angle between the driving and driven member axes in all operative positions, said means including a beam member passing through the spider member and having spherical engagement at its opposite ends with the driving and driven members, said beam member being movable endwise relative to the spider member, yielding means to resist axial displacement of only one of said engagements upon relative angular movement of the driving and driven members, and means operative between the beam member and the spider member to cause the latter to bisect said angle.

2. A universal joint adapted for transmitting a constant velocity from one shaft to another comprising, a pair of yoke members one connected to a driving shaft and the other to a driven shaft, each yoke member having forked ends provided with spherical peripheral surfaces which have a common center, each forked end having opposed bearing surfaces parallel with its shaft axis, an outer spherical casing complemental to and seating on said spherical surfaces to enclose and substantially seal the joint structure, a spider member having four trunnions 90° apart forming two transverse axes in a common plane, a rotary thimble-like wheel member journaled on each trunnion and rollable between the bearing surfaces in one of the forked members for transmitting torque, said wheel members being held against radial displacement by slidably engaging at their outer ends the inside of the outer casing, and a beam structure having a fixed fulcrum at the center of one of said forked members and a yielding fulcrum at the center of the other forked member, said beam structure passing through the spider member to maintain the latter in a position to bisect the angle between the driving and driven shafts at all times.

3. A universal joint adapted for transmitting a constant velocity from one shaft to another comprising, a pair of yoke members one connected to a driving shaft and the other to a driven shaft, each yoke member having forked ends provided with spherical peripheral surfaces which have a common center, each forked end having opposed bearing surfaces parallel with its shaft axis, an outer spherical casing complemental to and seating on said spherical surfaces to enclose and substantially seal the joint structure, a spider member having four trunnions 90° apart forming two transverse axes in a common plane, thimble-like bearing members journaled on each trunnion and rollable between the parallel bearing faces in the forked members whereby to transmit torque, said bearing members having the outer end walls thereof arranged to engage the outer ends of the trunnions to assume end thrust, and said bearing members being held against radial displacement by the slidable engagement of the outside of their end walls with the inside of the outer casing, and a beam structure having a fixed fulcrum at the center of one of said forked members and a yielding fulcrum at the center of the other forked member, said beam structure passing through the spider member to maintain the latter in a position to bisect the angle between the driving and driven shafts at all times.

ADIEL Y. DODGE.